United States Patent [19]

Busseniers et al.

[11] 4,442,657
[45] Apr. 17, 1984

[54] DEVICE FOR TRANSFERRING FROM A CONVEYING BELT, GOODS SUCH AS BUT NOT EXCLUSIVELY, BISCUITS

[75] Inventors: Roger Busseniers, Brussels; Martial Deudon, Sint-Kruis-Brugge, both of Belgium

[73] Assignee: N.V. Biscuits Delacre S.A., Belgium

[21] Appl. No.: 276,707

[22] Filed: Jun. 23, 1981

[30] Foreign Application Priority Data

Jun. 27, 1980 [BE] Belgium .............................. 0/201216

[51] Int. Cl.³ ..................... B65G 43/00; B65G 47/00; B65B 25/16
[52] U.S. Cl. ...................................... 53/500; 53/534; 414/73
[58] Field of Search ............................ 414/73, 72, 75; 198/457, 689, 476; 53/534, 532, 500

[56] References Cited

U.S. PATENT DOCUMENTS

| | | | |
|---|---|---|---|
| 2,855,740 | 10/1958 | Noland, Jr. et al. | 53/534 X |
| 2,978,854 | 4/1961 | Fairest | 53/534 X |
| 3,080,079 | 3/1963 | Lecrone et al. | 198/689 X |
| 3,202,302 | 8/1965 | Insolio | 414/73 |
| 3,342,018 | 9/1967 | Temple | 198/689 X |
| 3,592,329 | 7/1971 | Fleischauer | 198/689 X |
| 3,757,926 | 9/1973 | Gendron et al. | 198/689 X |
| 4,135,619 | 1/1979 | Cerboni | 198/689 X |

FOREIGN PATENT DOCUMENTS

WO80/00955 5/1980 PCT Int'l Appl. ................... 414/73

Primary Examiner—James F. Coan
Attorney, Agent, or Firm—Scully, Scott, Murphy & Presser

[57] ABSTRACT

A device is disclosed which grips and transfers articles from one conveyor to another conveyor or to containers on another conveyor. The incoming conveyed articles are sensed and the drive mechanism of an overhead vacuum conveyor which grips and transfers the articles is adjusted automatically to align a gripper with an article.

10 Claims, 1 Drawing Figure

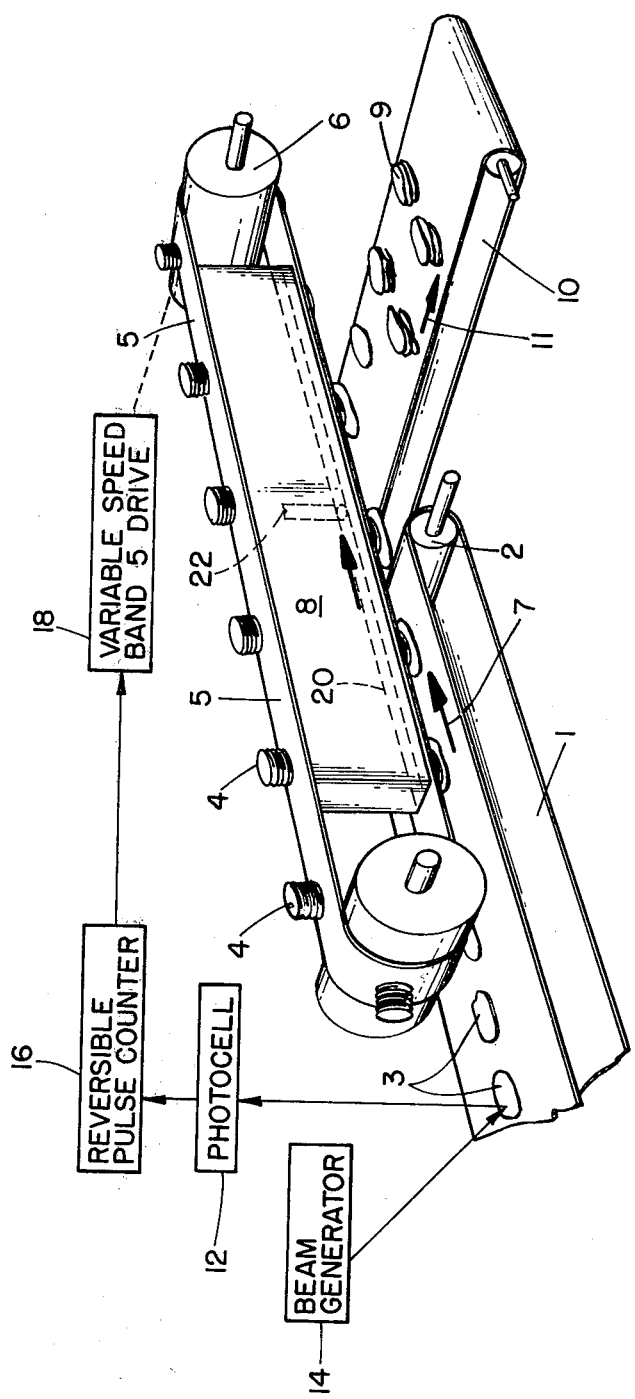

DEVICE FOR TRANSFERRING FROM A CONVEYING BELT, GOODS SUCH AS BUT NOT EXCLUSIVELY, BISCUITS

This invention relates to a device which makes possible transferring goods such as, but not exclusively, biscuits from a conveying band whereon said goods are so laid down that the spacing between said goods may vary within some determined limits, whereby said transferring can occur along the direction of one or a plurality of conveying tracks and the device comprises means to grip said goods on said conveying band and lay same down on the one said conveying tracks, generally into containers or boxes present on said conveying track or tracks.

The invention is mainly used in the art of packing biscuits into containers or boxes, but it is clear that the invention may also be used in any other art where a similar problem of transferring goods is encountered. The invention provides particularly a practical solution to the difficulties which appear with a completely automatic device, when a very large number of goods have to be laid down according to severe standards.

The invention is thus mainly designed to lay down into paper cups for example, biscuits of various types and size, which biscuits are present on one or several conveyings bands whereon such biscuits take such a position that the spacing therebetween is not fixed but can rather vary within well-determined limits. The device according to the invention has also for an object the solution of problems which are encountered when laying down an accurate number of biscuits, which also implies counting those gripping members which move over said small cups and those means which insure the laying down of the goods or biscuits into said cups. To obviate the drawbacks of the semi-automatic device and to insure a complete automation of the above-defined step, the goods are caught on the conveying band by gripping members fastened to an endless conveying band, said endless conveying band moving substantially in that plane where said conveying band moves and actually at least over such a distance which is long enough to bring a gripping member above a piece of goods to be gripped and to grip said piece of goods, whereby means are provided to sense the position of said piece of goods or of an apparatus cooperating with the passage of such a piece of goods, and according to said position of the piece of goods or apparatus, to bring said gripping member above the sensed piece of goods.

In an advantageous embodiment of the invention, said gripping members are mounted on an endless conveying band the lowermost run of which moves over some distance above said conveying band.

A feature of the invention lies in the speed with which the endless conveying band moves being equal to the speed of said conveying belt, whereby means are provided to increase or decrease the speed of the endless conveying band or of said conveying band and to bring a gripping member above a piece of goods to be gripped. According to an embodiment of the invention, a pulse counter is provided to record the lag or head of a piece of goods to be gripped relative to a gripping member.

Other details and features of the invention will stand out from the following description given by way of non limitative example and with reference to the accompanying drawing, the single FIGURE of which is a diagrammatic perspective showing of the device according to the invention.

The device shown diagrammatically in the FIGURE comprises a conveying band 1 which is preferably continuously driven by a variable speed drive as described hereinbelow. Said conveying band can be a conveying belt which is driven by rollers among which but roller 2 is shown. The goods, notably biscuits 3 are laid down by known means on said conveying band according to a rate which may be irregular but which is in any case so determined that the biscuits lie within pre-determined limits. Actually the pitch, that is the rate with which the biscuits are laid down, or the spacing between said biscuits on the conveying band, may vary within substantial limits. This results in the gripping members, such as clamps, suction cups, magnets in the case of mechanical goods, not always lying above the goods to be gripped. When such a condition is not corrected, any automation of such a device is not to be considered.

According to the invention, said gripping members are comprised of suction cups 4 which are mounted on an endless conveying band 5 which moves over drums 6 in the direction shown by arrow 7. Such movement direction 7 is also the one of conveying band 1. The possibility of the conveying band and the endless conveying band moving along opposite directions is theoretically not to be excluded.

The endless conveying band 5 is mounted together with drum 6 on a frame not shown in the FIGURE. The endless conveying band 5 lies at such a distance from the uppermost run of the conveying band that the suction cups which are made from a flexible material such as natural or synthetic rubber, come accurately in contact with said biscuits 3.

The underpressure required for sucking biscuits 3 by means of said suction cups 4 is generated therein during the passage thereof along the lowermost side of box 8 wherein prevails an underpressure or vacuum. That flexible band the endless conveying band 5 can be made of, is provided with openings in the locations of the suction cups, in such a way that when said cups pass along a slot 20 (shown in phantom) provided in the lowermost side of box 8, a suction action is generated inside the suction cups at that moment where said suction cups move along said slot. Conventional sealing means are provided over the distance along which the endless conveying band 5 moves along the lowermost side of box 8. The biscuits gripped by the suction cups are released where the suction action stops. The biscuits then fall in the paper cups or containers 9 which are arranged on a last conveying track 10. Said conveying track 10 moves discontinuously in the direction as shown by arrow 11. When however it is desired to fill various small cups arranged next to one another on conveying track 10, there should be provided inside box 8 at least level with one such cup, for example the first cup, as considered in the movement direction of the suction cups, a pipe 22 (shown in phantom) from which a pressurized air stream can escape at the required time, which pipe opens at the level of said slot. It is thereby possible while retaining an under-pressure inside box 8 and as a suction cup still lies in the path of said slot, to act on the laying down of the biscuits inside the small cups.

It is clear that when it is considered that such a pipe is required for delivering regularly by means of a slight pressure, biscuits into the small cups, such a pipe may be provided above that location where the small cups lie and the air stream may be controlled by an easily adjustable programme.

There is further provided a counter for counting the biscuits to be delivered into each small cup. Actually said counter is influenced by the passage of the suction cups, whereby some tolerance regarding omissions has no influence on the continuous good operation of the device.

It is clear that the conveying track 10 does not have necessarily to move at right angle to the movement of conveying band 1.

The very principle of the invention has to be considered in the means which make it possible that said gripping members lie accurately over the biscuits 3 or in any case close enough above said biscuits to let the goods, that is the biscuits, be raised due to the suction action which is generated inside the suction cups 4.

To obtain such a result, there is provided a device fitted with a photocell 12 which responds to the reflecting of a beam emitted in a usual way by a generator 14, which beam is directed on the uppermost run of conveying band 1. Said beam contacts the conveying band 1 on the path of the biscuits conveyed thereby and the reflecting of said beam is changed when the beam as sent by the photoelectric device meets a piece of goods, that is a biscuit. The fixed point where the beam contacts the conveying band is considered as that point which does not require any correction. It should further be mentioned that in the above-described example, the pitch by which the biscuits are spaced from one another is shorter than the pitch by which the suction cups are spaced from one another. When a biscuit reaches the above-defined point, the reflection angle of the light beam changes and the photocell responds thereto. By means of an electronic apparatus, for example, said photoelectric device starts a pulse counter 16 and the speed of the endless conveying band 5 is doubled by a variable speed drive 18. The original speed or normal speed of said conveying band is considered as V. The doubled speed is then 2 V.

There results therefrom that the biscuit under consideration is caught up by the suction cup. When said suction cup has reached the above-defined point where no correction is required, the pulse counting is reversed in reversible pulse counter 16. At this moment the suction cup has moved over a distance D/2, whereby the speed with which the biscuit moves did remain constant. As the pulse counter returns to zero, the movement speed of said suction cup is back to the original value thereof, that is V.

While the number of pulses being subtraction is equal to the number of pulses being added, the suction cup under consideration has traversed a distance D and actually from said above-defined point and the biscuit a distance D/2. From the biscuit sensing and the above-defined point where no correction is required, the biscuit will be moved over a distance D/2+D/2, that is a distance D by means of said suction cup, from said point. Due to this arrangement, the suction cup will lie accurately over the piece of goods or biscuit to be gripped.

When the suction cup lies accurately over the piece of goods at that moment where the beam from the photoelectric device senses said piece of goods, no correction is to be made.

The above-described device thus allows with reliable and very simple means, a complete automatizing of those operations comprised of gripping and laying down into small cups after counting, a very large number of goods, in the present case biscuits. The device according to the invention fulfills essentially the requirements resulting from a very high production rate followed by transferring and counting the produced goods.

It must be understood that the invention is in no way limited to the above embodiments and that many changes may be brought therein without departing from the scope of the invention as defined by the appended claims.

For instance the paths of the conveying bands and conveying track(s) do not have necessarily to be as described above and the number of conveying tracks has no limit. The speed changes to be imparted to conveying band 1 or the endless conveying band may also be obtained by any other suitable means than the above-described ones.

We claim:

1. Device for transferring goods such as but not exclusively, biscuits from a conveying band whereon said goods are so laid down that the spacing between said goods may vary within some determined limits, whereby said transferring can occur along the direction of one or a plurality of conveying tracks and the device comprises means to grip said goods on said conveying band and lay said goods down on one of said conveying tracks, generally into containers or boxes present on said conveying track or tracks, in which said goods are caught on the conveying band by gripping members fastened to an endless conveying band, said endless conveying band moving substantially in that plane where said conveying band moves and actually at least over such a distance which is long enough to bring a gripping member above a piece of goods to be gripped and to grip said piece of goods, whereby means are provided to sense the position of said piece of goods or of an apparatus cooperating with the passage of such a piece of goods, and according to said position of the piece of goods or apparatus, to bring said gripping member above the sensed piece of goods.

2. Device as defined in claim 1, in which said gripping members are mounted on an endless conveying band the lowermost run of which moves over some distance above said conveying band.

3. Device as defined in claim 1, in which the speed with which said endless conveying band moves is equal to the speed of said conveying band, whereby means are provided to increase or decrease the speed of the endless conveying band or said conveying band, and to bring a gripping member above a piece of goods to be gripped.

4. Device as defined in claim 1, in which a pulse counter is provided to record the lag or lead of a piece of goods to be gripped relative to a gripping member.

5. Device as defined in claim 4, in which means are provided to speed up or slow down the movement of the endless conveying band with said gripping members according to the lag or lead recorded by said pulse counter.

6. Device as defined in claim 1, in which said gripping members are comprised of suction cups which are fastened to an endless conveying band the lowermost run of which is lead along the lowermost side of a box wherein prevails an underpressure, which box is provided with a slot which extends over that path where the underpressure has to prevail inside said suction cups.

7. Device as defined in claim 6, in which at least one pipe through which an air stream may escape, is provided inside said box, which pipe opens level with said slot.

8. Device as defined in claim 1, in which counting of the goods, for instance biscuits, to be laid down into the small cups results from counting said gripping members as they pass level with a small cup, whereby means are provided to let said counting occur relative to a single small cup.

9. Device as defined in claim 6, in which said suction cups are made from a flexible material.

10. Device as defined in claim 1, in which said apparatus cooperating with the passage of a piece of goods is formed by a gate which is so designed as to release a piece of goods which comes to lie in front thereof, which apparatus is part of a device for spacing goods by a determined pitch.

* * * * *